Oct. 16, 1945.    J. E. TWIDWELL    2,387,198
HAYSTACKER AND AUTOMATIC RELEASE
Filed Oct. 27, 1944    3 Sheets-Sheet 3
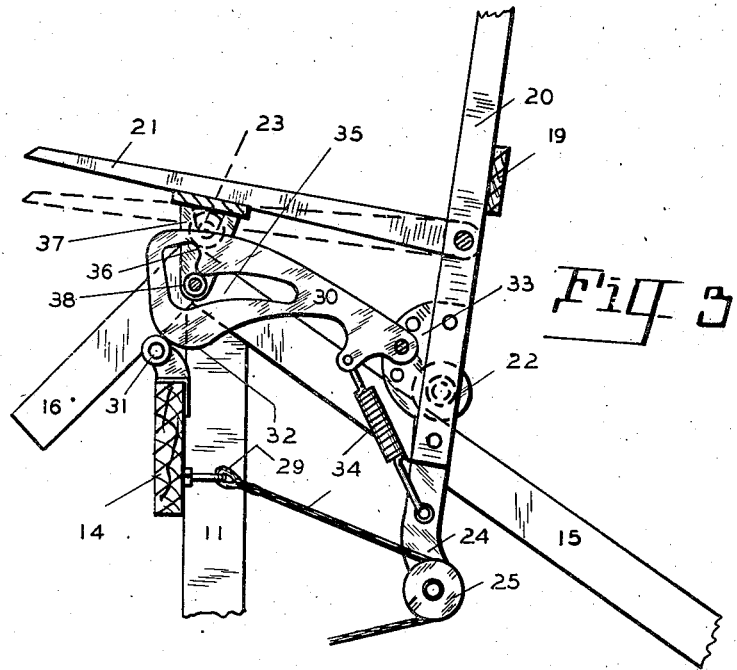
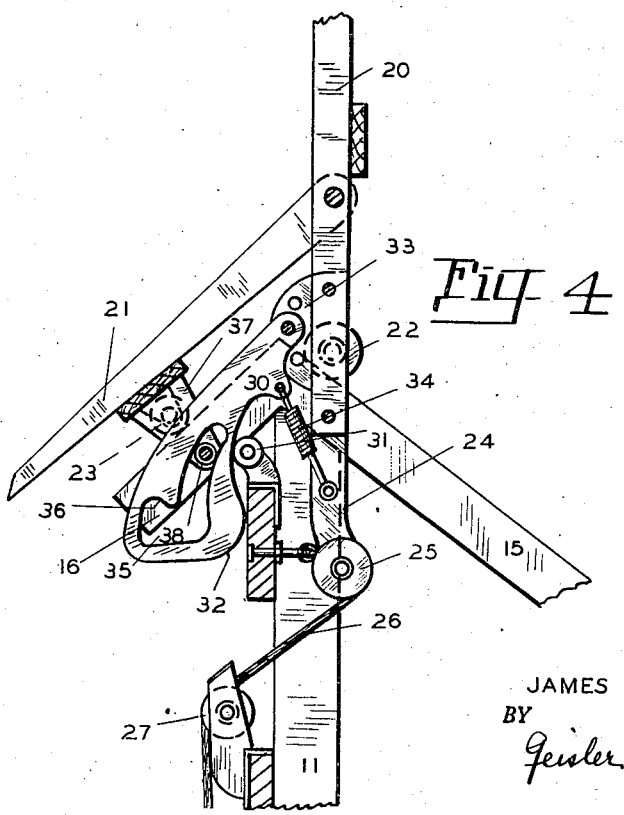
INVENTOR.
JAMES EDGAR TWIDWELL
BY
*Geisler and Geisler*
ATTORNEYS Patented Oct. 16, 1945

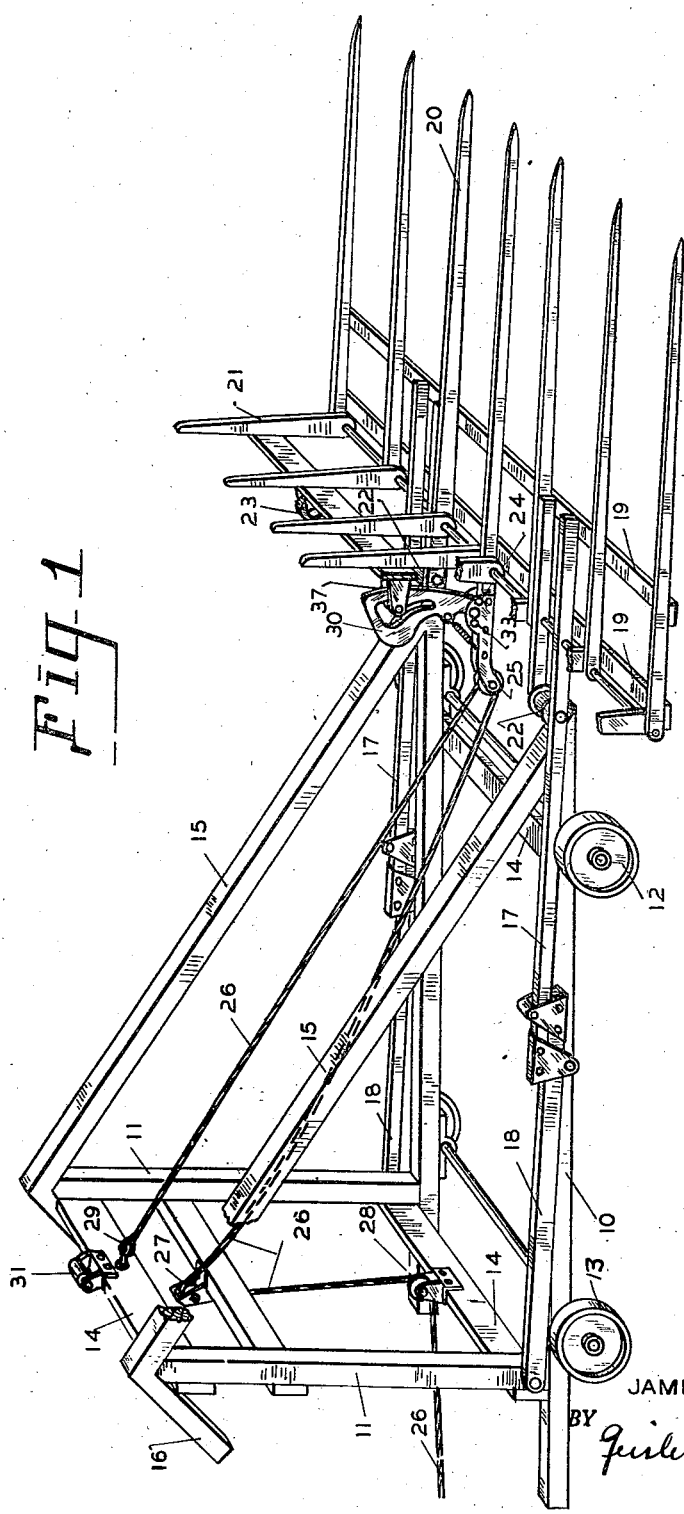

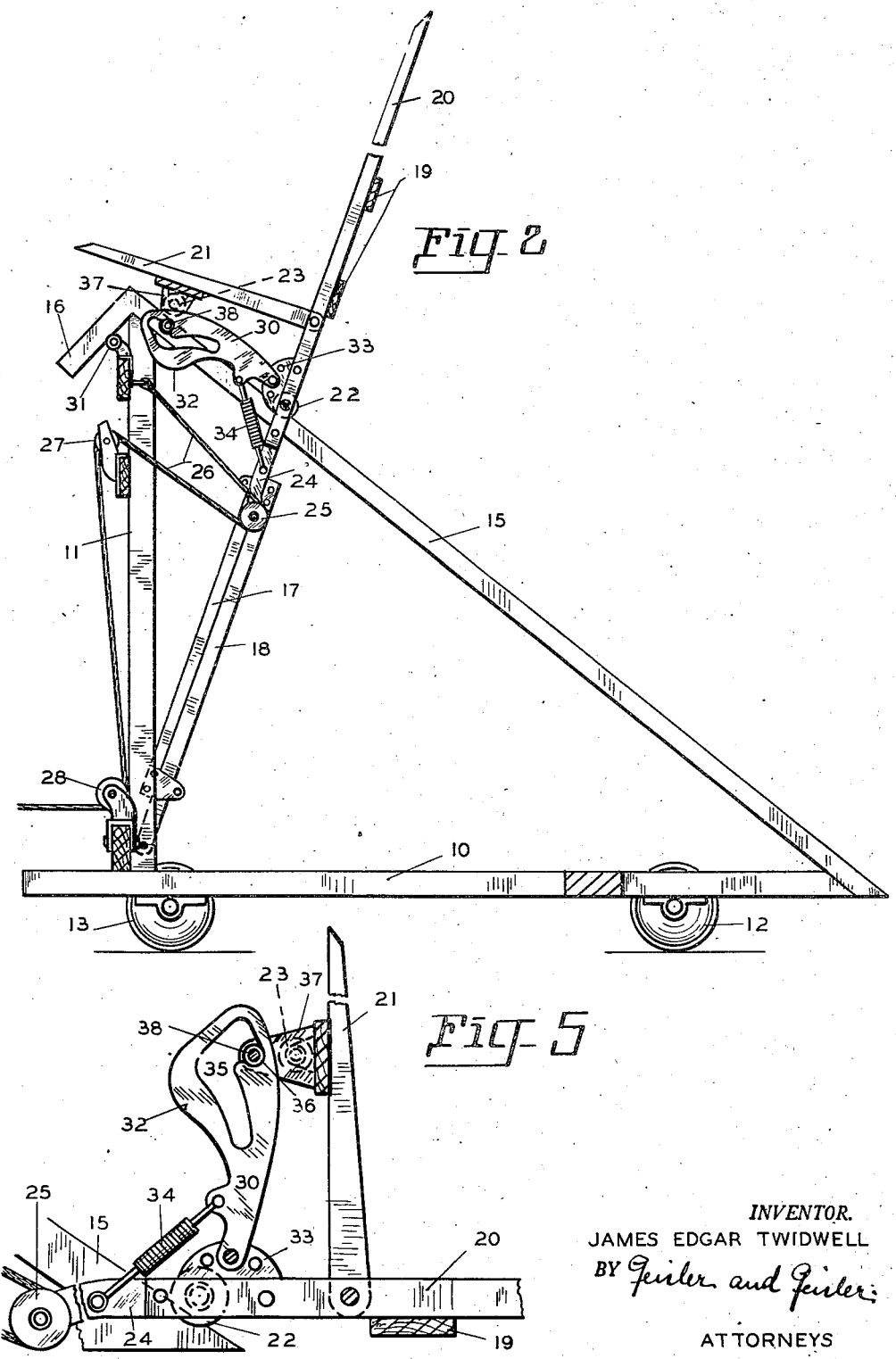

2,387,198

UNITED STATES PATENT OFFICE 2,387,198

HAYSTACKER AND AUTOMATIC RELEASE

James Edgar Twidwell, La Grande, Oreg.

Application October 27, 1944, Serial No. 560,636

4 Claims. (Cl. 214—139)

This invention relates to a simple mechanical device for lifting a quantity of hay from the ground in front of the device and depositing it on top of a stack at the rear of the device.

More specifically, this invention relates to haystackers employing the familiar type of sweep rake adapted to swing upwardly in a vertical arc of approximately 90 degrees.

A problem with ordinary haystackers of this type is to have the hay slide off of the raised sweep rake at exactly the right moment when the rake has reached a desired predetermined position so that the hay which is being delivered by the sweep rake will be deposited on top of the stack and not in front of it, as occurs when the hay slides off of the rake too soon, or behind the stack, as occurs when the hay does not slide off the rake as soon as expected.

The object of the present invention is to provide an improved, simple and dependable means for causing the hay to slide off the sweep rake the moment the rake reaches a predetermined raised position, thus insuring the dropping of the hay at the desired location on the stack, and to prevent the hay from sliding off of the rake ahead of time.

Another object of this invention is to provide means which will function automatically for this purpose with the movement of the rake so that no setting or adjusting of such means will be required when the device is in operation.

A further object of this invention is to provide a haystacker of the type above indicated which will be very simple and inexpensive to build and to maintain.

These objects and further incidental advantages I attain by constructing my haystacker and automatic release as hereinafter briefly described with reference to the accompanying drawings.

In the drawings:

Figure 1 is a side view, in perspective, of my complete device showing the sweep rake in position to start the operation of raising and stacking the hay;

Figure 2 is a side elevation of the device showing the sweep rake in the process of being raised but before the sweep rake has reached the top position;

Figure 3 is a fragmentary elevation of the sweep rake and the automatic release, drawn to a slightly larger scale, illustrating the relative position of the associated parts immediately prior to the discharging to the hay from the sweep rake, it being assumed in these figures that a quantity of hay (not shown) is being carried by the sweep rake;

Figure 4 is a fragmentary elevation similar to Figure 3 showing the sweep rake in discharging position; and Figure 5 is a side elevation of the control latch or lock for the back wall of the sweep rake, showing the same in normal locking position with the rake in the starting position of Figure 1.

My stacker includes a simple frame support which comprises a pair of bottom longitudinal members 10 which may be in the shape of runners or which may be supported at the front and rear on pairs of wheels 12 and 13. The frame also includes upright members 11 at the rear and various transverse members 14. Suitable cross braces (not shown) may also be added to give strength and rigidity to the frame.

A pair of inclined tracks 15 extend upwardly and rearwardly from the front ends of the bottom members 10 to the top of the upright members 11. At their upper extremities these tracks 15 join a second pair of tracks 16 respectively which extend for a short distance downwardly and to the rear from the top of the frame. Both pairs of tracks are rigidly mounted on the frame.

The sweep rake, which is shown clearly in Figure 1, has the usual prongs or teeth 20 rigidly attached to suitable rake frame members 19 and also has a hinged rear wall 21. The rake is secured to a pair of telescoping or double arms comprised of forward sections 17 and rear sections 18. The rear sections 18 are hinged to the rear of the frame, as shown in Figure 1, and each of the forward sections 17 carries a roller or guide wheel 22 adapted to roll on the tracks 15. Since the front arm sections 17 are slidable on the rear arm sections 18, the arms are self-adjusting in length, thus enabling the guide wheels 22 always to be in contact with the tracks 15 on which they roll, as apparent from Figure 2.

A similar pair of rollers or guide wheels 23 are carried by the rear wall 21 of the rake and are adapted to travel on the upper ends of the tracks 15, thus when the rake has reached the position shown in Figure 2, and also to travel on the tracks 16, as will be explained later.

A pulley arm extension 24, rigidly secured to the rake frame, carries a pulley 25 over which the lifting cable 26 passes. The upper end of the cable 26 is anchored to the hay-stacker frame at 29, and the cable also passes around pulleys 27 and 28 so that when the opposite end is pulled by any suitable means, mechanically or manually operated, the rack will be caused to travel up the inclined tracks 15.

The hinged rear wall of the rack is held in normal position, more or less perpendicular to the main teeth 20 by a locking latch support 30. This locking latch 30 is pivotally mounted on a supporting element 33 (Figure 5) which is secured to the pulley arm 24. The latch 30 has an L-shaped slot 35 which is also formed with a special notch 36 (Figures 4 and 5) adapted to engage a latch disk 38 rotatably mounted in a double bracket 37 attached to the rear wall 21 of the rake. A spring 34 tends to swing the latch 30 counter-clockwise (as viewed in the drawings), and thus tends to hold the latch with its notch 36 engaging the latch disk 38. As long as the latch disk 38 and the latch notch 36 are so engaged, the hinged rear wall 21 of the rake and the latch 30 operate to hold each other rigidly in place against counter-clockwise movement, as apparent from Figure 5, and thus the pushing of the hay on the rake against the rear wall will not push the rear wall from its normal position as long as the latch and latch disk are in this relative engaging position.

The rear outside edge of the latch 30 (Figure 5) is curved, as indicated in Figure 2, in order to engage with and lie upon a latch-controlled roller 31 (Figures 1 to 4), when the sweep rake is at the top of the frame. When the latch first contacts the roller 31 during the upward movement of the rake, the result at first is to lift the latch slightly as shown in Figure 3. Then, as the rake proceeds further to the top of the frame, the latch, now resting on the roller 38, will be able to drop into the position shown in Figure 4.

The operation of the haystacker is as follows:

Assuming the hay to be loaded on the sweep rake when the sweep rake is in the starting position shown in Figure 1, a pull is exerted on the cable 26 which causes the rake to move up along the tracks 15 on the wheels 22. At the same time the rake is tilted more and more upwardly as it moves along the tracks due to the fact that the rake is attached to the double arms 17—18 which are pivotally connected to the haystacker frame. During this tilting of the rake, however, the back wall 21 of the rake will be held in its relative position by the latch support 30 as previously explained.

When the rake, moving along the tracks 15, reaches the position illustrated in Figure 2, the guide wheels 23, mounted on the rear wall 21 of the rake, will be brought into contact with the tracks 15. As the rake continues this upward movement from the position of Figure 2 to the position of Figure 3, the guide wheels 23, which will now be rolling on the tracks 15, also begin to lift the rear wall 21 of the rake slightly so that the hay load, now chiefly carried by the rear wall 21 of the rake, will be supported by the wheels 23 and not by the latch 30. This relieves the strain on the latch and also enables the latch to become easily disengaged from the locking disc 38 of the rear wall. While this is taking place, the latch itself is engaged by the roller 31 which then proceeds to cause the latch to be lifted sufficiently to complete its disengagement from locking position, as shown in Figure 3. While the rake continues the upward swing the wheels 23 pass over the tops of the tracks 15 to the descending tracks 16. This causes the rear wall 21 to drop down into the discharging position shown in Figure 4, which results in causing the hay to slide from the rake down over the rear wall and onto the stack at the rear of the haystacker as desired. The curved under edge of the latch 30 permits the latch, after being temporarily raised, to drop down into the position shown in Figure 4 so as not to interfere with the lowering of the rear wall 21 of the rake. The rake, as indicated in Figure 4, has now reached the limit of its upward swing.

When the cable 26 is gradually released for the lowering of the rake, the weight of the rake will cause the wheels 22 to descend along the tracks 15 since these wheels never pass over the top ends of the tracks 15. As the main portion of the rake carried by the wheels 22 starts moving downwardly, the wheels 23, supporting the rear wall of the rake, will first be caused to travel back upwardly on the tracks 16 until they reach the tops of the tracks 15. At the same time the latch 30, being pulled forwardly over the roller 31 will be lifted until the latch and rear wall are again in the position shown in Figure 3. Further slight downward movement of the rake causes the latch 30 to be freed from the roller 31 and the rear wall 21 to be lowered until the locking disk 38 of the rear wall again becomes engaged with the notch 36 of the latch 30. The spring 34 facilitates the return of the latch to locking position as soon as the latch is disengaged from the roller 31 and the spring 34 also prevents any jarring of the rake or frame from causing the latch subsequently to become disengaged from the wall 21 as the rake resumes its normal starting position.

Thus, the latch functions automatically with the raising and lowering of the rake to hold the back wall 21 of the rake in normal position at all times, except when the rake is approximately at the end of the upward swing; and since the rear wall 21 can not be lowered to discharging position until the wheels 23 have passed over the upper extremity of the tracks 15, there is no danger of the hay being discharged prior to the predetermined moment in the upswing of the rake; and the dropping of the back wall will insure the immediate and positive discharging of the hay at the desired location.

I claim:

1. In a haystacker of the character described, a frame, a pair of inclined tracks on said frame leading from the bottom to the top, a second pair of tracks leading downwardly and rearwardly from the upper ends of said first mentioned tracks, a sweep rake, a hinged back wall for said rake, a locking latch mounted on said rake to hold said back wall normally in fixed position with respect to said rake, said latch having an L-shaped slot, a notch in said L-shaped slot, a cooperating engaging element on said wall extending into said slot and adapted to be engaged by said notch, a pair of self-adjusting arms attached to said rake, said arms hinged to said frame for movement in substantially vertical planes, a guide wheel on each of said arms, said wheels mounted on said first mentioned tracks respectively, engaging wheels mounted on said back wall for engaging the upper ends of said first mentioned tracks when said rake nears the end of its upward travel, means for moving said rake upwardly along said first mentioned tracks, latch disengaging means located at the top of said frame adapted to lift said locking latch when the bottom edge of said latch rides over said disengaging means, whereby when said rake is near the upper ends of said tracks said engaging wheels on said back wall will be brought into engagement with said first mentioned tracks and lift said back wall while said latch disengaging means lifts said latch, and causes said cooperating element to be disengaged from said notch, and whereupon further upward movement of said rake will cause said back wall to drop to discharging position when said back wall wheels pass on to said second pair of tracks.

2. A haystacker of the character described comprising a frame, a pair of inclined tracks on said frame leading from the front to the rear, a sweep rake, a hinged back wall for said rake, a latch member hinged to said rake engaging said back wall to hold said back wall normally in fixed position with respect to said rake, an L-shaped slot in said latch member, a notch in said slot, a cooperating engaging element on said back wall extending into said slot and adapted to be engaged by said notch, a pair of self-adjusting arms attached to said rake, said arms hinged to said frame for movement in substantially vertical planes, a guide wheel on each of said arms, said wheels mounted on said tracks respectively, track-engaging elements mounted on said back wall for engaging the upper ends of said tracks and raising said back wall when said rake nears the end of its upward travel, means for moving said rake upwardly along said tracks, latch lifting means located at the top of said frame adapted to lift said latch member when the bottom edge of said latch member rides over said latch lifting means and said rake nears the end of its upward travel, whereby when said rake is near the upper ends of said tracks said back wall and said latch members will both be lifted sufficiently to enable said notch in said latch member to be disengaged from said cooperating engaging element on said back wall, and whereupon further upward movement of said rake will cause said back wall to drop to discharging position when the track engaging elements on said back wall pass over the top ends of said tracks.

3. A haystacker of the character described comprising a frame, a pair of inclined tracks on said frame leading from the front to the rear, a second pair of tracks leading downwardly and rearwardly from the upper ends of said first mentioned tracks, a sweep rake, a hinged back wall for said rake, a latch member pivotally mounted on said rake engaging said back wall to hold said back wall normally in fixed position with respect to said rake, a notch in said latch member, a cooperating engaging disk on said back wall adapted to engage said notch, a pair of telescoping arms attached to said rake, said arms hinged to the rear of said frame for movement in substantially vertical planes, a guide wheel on each of said arms, said wheels mounted on said first mentioned tracks respectively, a pair of guide wheels mounted on said back wall for engaging the upper ends of said first mentioned tracks when said rake nears the end of its upward travel, cable means for moving said rake upwardly along said first mentioned tracks, a roller located at the top of said frame adapted to lift said latch member when said rake nears the end of its upward travel, said latch member having a curved edge riding over said roller controlling the movement of said latch member as said latch member rides over said roller, whereby when said rake is near the upper ends of said first mentioned tracks said guide wheels on said back wall will be brought into engagement with said first mentioned tracks and lift said back wall sufficiently to enable said notch on said latch member to be disengaged from said disk on said back wall when said latch member contacts said disengaging means, and whereupon further upward movement of said rake will cause said back wall to drop to discharging position when the guide wheels on said back wall pass over the top ends of said first mentioned tracks and descend along said second mentioned tracks.

4. A haystacker of the character described comprising a frame, a pair of inclined tracks on said frame leading from the bottom to the top, a second pair of tracks leading downwardly and rearwardly from the upper ends of said first mentioned tracks, a sweep rake, a hinged back wall for said rake, a locking latch hinged to said rake engaging said back wall to hold said back wall normally in fixed position with respect to said rake, cooperating engaging elements on said latch and back wall, a pair of telescoping arms attached to said rake, said arms hinged to the rear of said frame for movement in substantially vertical planes, a guide wheel on each of said arms, said wheels mounted on said first mentioned tracks respectively, a pair of similar guide wheels mounted on said back wall for engaging the upper ends of said first mentioned tracks when said rake nears the end of its upward travel, cable means for moving said rake upwardly along said first mentioned tracks to the top of said frame, a roller located at the top of said frame adapted to lift said locking latch when said rake nears the end of its upward travel, said locking latch having a curved edge riding over said roller controlling the movement of said locking latch as said locking latch rides over said roller, whereby when said rake is near the upper ends of said first mentioned tracks said guide wheels on said back wall will be brought into engagement with said first mentioned tracks and lift said back wall sufficiently to enable said locking latch to be disengaged from said back wall when said locking latch contacts said roller, and whereupon further upward movement of said rake will cause said back wall to drop to discharging position when the guide wheels on said back wall pass over the top ends of said first mentioned tracks and descend along said second mentioned tracks, said second mentioned tracks controlling the lowering of said back wall.

JAMES EDGAR TWIDWELL.